United States Patent
Congdon

(10) Patent No.: US 8,363,654 B2
(45) Date of Patent: Jan. 29, 2013

(54) PREDICTIVE PACKET FORWARDING FOR A NETWORK SWITCH

(75) Inventor: Paul T. Congdon, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 694 days.

(21) Appl. No.: 12/266,783

(22) Filed: Nov. 7, 2008

(65) Prior Publication Data

US 2010/0118885 A1 May 13, 2010

(51) Int. Cl.
*H04L 12/56* (2006.01)
(52) U.S. Cl. .................................................... 370/392
(58) Field of Classification Search .................. 370/392, 370/419, 353, 235, 360; 709/224, 225, 203, 709/217
See application file for complete search history.

(56) References Cited

U.S. PATENT DOCUMENTS

| | | | |
|---|---|---|---|
| 2005/0198187 A1* | 9/2005 | Tierney et al. | 709/214 |
| 2007/0078958 A1* | 4/2007 | Bennett | 709/223 |
| 2008/0086662 A1* | 4/2008 | Li et al. | 714/704 |
| 2008/0262991 A1* | 10/2008 | Kapoor et al. | 706/20 |
| 2009/0097407 A1* | 4/2009 | Buskirk et al. | 370/235.1 |

* cited by examiner

*Primary Examiner* — Dang Ton
*Assistant Examiner* — Nourali Mansoury

(57) ABSTRACT

A network switch includes a predictor using data in a packet to predict a flow for the packet. A forwarding engine forwards at least a portion of the packet on a switch fabric to an egress port in the switch determined from the predicted flow. The forwarding engine is operable to forward the packet on the switch fabric to the egress port determined from the predicted flow prior to a lookup module determining a flow from a lookup.

14 Claims, 4 Drawing Sheets

PREDICTIVE PACKET FORWARDING FOR A NETWORK SWITCH

BACKGROUND

Ethernet and IP communications have become the most popular means of computer communications, in part due to the simplicity and scalability of connectionless, packet-oriented communications over a statistically multiplexed network. As Ethernet moves to 10 Gbps speeds and beyond, it would be useful to utilize this commodity technology in specialized high performance parallel computing environments where traditionally specialized interconnect fabrics have been deployed. The interconnect fabrics commonly used in the high performance parallel computing environments are designed for Message Passing Interface (MPI) applications. These interconnect fabrics are focused on connection oriented, low latency and high-bandwidth communications, but are often complex and expensive. Using commodity Ethernet packet switches instead of specialized interconnection fabrics can lower both the cost and the complexity of the parallel computing systems. However, current Ethernet packet switches suffer from excessive switch latency. If these packet switches are deployed in lieu of MPI-based interconnect fabrics in parallel computing systems, data transmission could result in system bottlenecks and increased response times.

In addition, there is a trend towards multiplexing a variety of different traffic types (e.g., voice, video and data), each potentially with different service requirements, onto the same network fabric. In all of these situations, low latency, yet policy-rich forwarding based upon flow classification would be useful. Providing these rich forwarding features without negatively impacting the switch latency puts extreme pressure on the classification process of a network switch to be fast and reliable.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
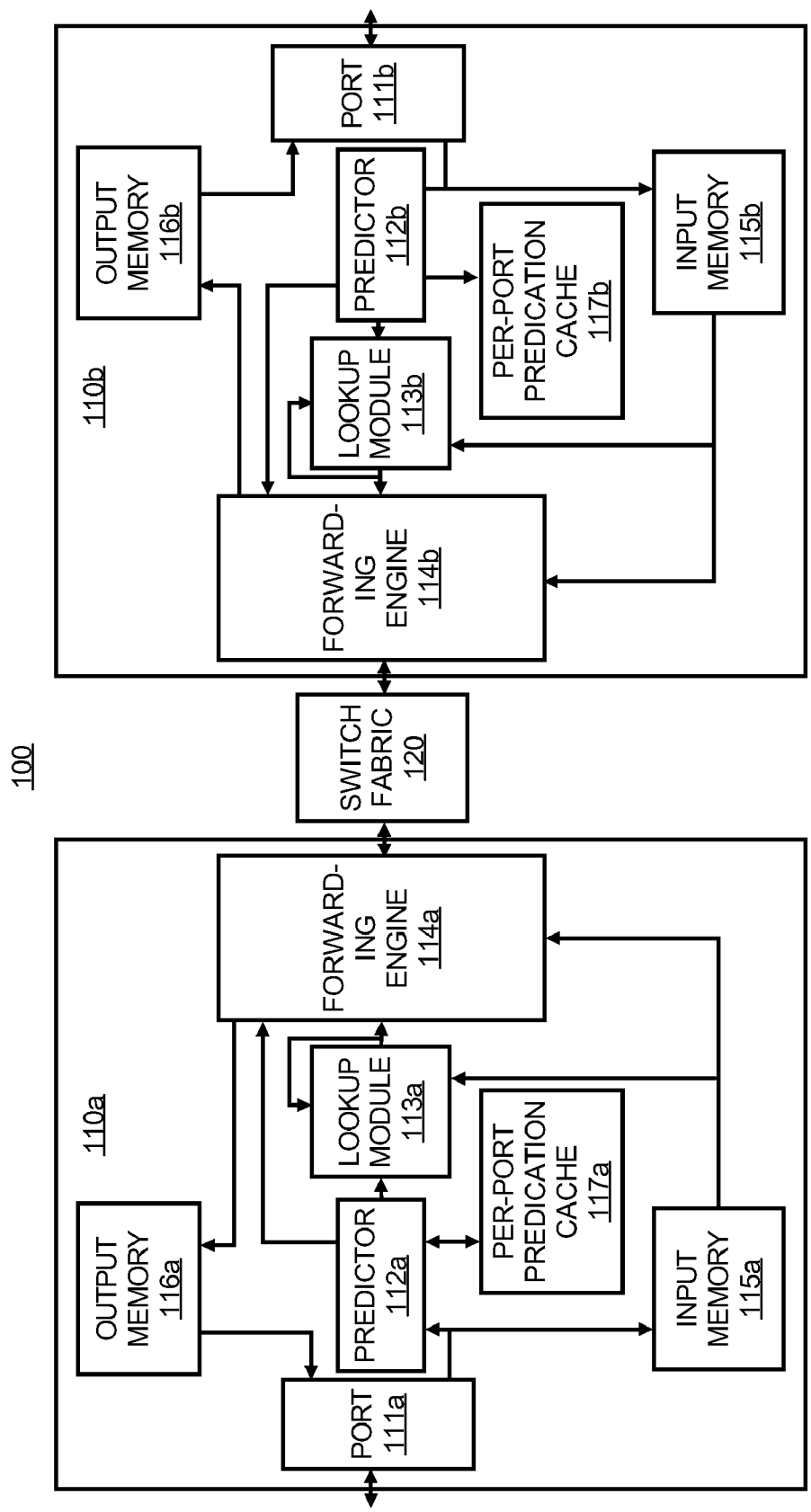
FIG. 1 illustrates a network switch, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures are not described in detail so as not to unnecessarily obscure the description of the embodiments.

According to an embodiment, network switch architecture reduces switch latency by predicting a flow for a packet. A network switch is a device that connects network segments. A flow is a sequence of packets from a particular source to a particular destination. A flow may be assigned to a particular egress port in the network switch, so all received packets for the flow are forwarded to the egress port and transmitted toward the destination. An egress port is a port in the network switch configured to transmit outgoing packets to the packet's destination. An ingress port in the network switch is a port configured to receive incoming packets from the network. A port may operate as both an ingress and egress port.

Flow prediction is performed using signatures. A network switch is configured to determine a signature from data in a packet. The signature is compared to stored signatures to identify a flow and a corresponding egress port for the packet. The flow prediction can be much faster than performing a lookup in a large table to determine a packet's flow, because less data from the packet is needed to determine the signature and predict the flow. Furthermore, the lookup may be performed to confirm the accuracy of the prediction (i.e., whether the correct flow has been determined for the received packet). However, at least some bits of the packet may be forwarded on the switch fabric to the egress port prior to the completion of the lookup confirmation or even prior to beginning the lookup, in order to optimize switching speed. Furthermore, at least some bits of the packet may be transmitted from the egress port prior to the completion of the lookup confirmation or even prior to beginning the lookup. This is as a result of the reduction in latency due to the use of the flow prediction when compared to conventional table lookup to determine an egress port.

Furthermore, switch latency is improved, because flow prediction is performed prior to the lookup or in parallel with the lookup. Also, the prediction of the flow for the packet is performed as data from the packet is received, but prior to receiving all the data for the packet. Second, the transmission of the packet on the egress port is allowed to begin before the current packet has been completely received and before the packet is completely transferred across the network switch fabric/backplane to the egress port. As a result of the reduction in switching latency, this network switch architecture may be deployed for switching in high performance parallel computing environments or other environments.

FIG. 1 illustrates a switch 100, according to an embodiment. The switch 100 includes line cards 110 connected via a switch fabric 120. In particular, line cards 110a and 110b are shown. However, the switch 100 may have more line cards than shown.

Also, each of the line cards 110 may have more than a single port 111a, and potentially more lookup modules, but an individual port will be associated with one lookup module. Each port has its own predictor and cache. The ports may also share the input and output memories. If the input and output memories are shared, ports could share a predictor and cache.

The port 111a receives and transmits packets. Thus, depending on whether a packet is being received at the port or transmitted from the port, the port 111a is described as an ingress port or an egress port, respectively. The port 111a may be connected to a network, and is configured to transmit packets in the network to other network devices and receive packets from other network devices via the network. As packets are received at the port 111a, the packets are stored in the input memory 115a. In one example, the memory 115a is a first-in-first-out buffer (FIFO), which may hold less than a single packet. The output memory 116a may also be a FIFO buffer that stores packet data for transmission via the port 111a.

The predictor 112a predicts a flow for a packet received on the port 111a. The predictor 112a uses data from the packet to predict the flow for the packet. The predictor 112a determines a signature for the packet from the packet data. The predictor 112a may determine the packet data by snooping a memory bus connected to the input memory 115a or by retrieving the packet data from the input memory 115a. The packet data may include portions of a flow key.

A flow key is a summarization of fields from the packet that uniquely identify the packet as being part of a flow. The flow key can be generalized as an n-tuple that is defined by a set H={$H_1, H_2, \ldots, H_n$} of fields from the packet. All packets that are part of a flow are subject to the same policy and treatment by the switch. In one example, for a typical routing switch that performs layer-2 bridging, layer-3 routing and transport level filtering, a flow key can be represented by a 9-tuple that includes the following fields: VLAN ID, destination MAC address, source MAC address, ethertype, IP protocol number, source IP address, destination IP address, TCP/UDP source port number and TCP/UDP destination port number.

In one embodiment, instead, a portion or portions of the flow key are used to determine the signature. The lookup, however, may use the entire flow key to identify a corresponding flow from a large flow table. As a result, the prediction process is much faster than the lookup. Note that in some instances or embodiments, the entire flow key may be used for the flow prediction.

The searching may start prior to receiving the entire signature (e.g., a partial signature match). The prediction cache 117a may include a table or some other form of a list of signatures, which contains the signatures of previously received packets. If a match is found, the packet is assumed to be part of the same flow as the previous packet from the matching signature and can be speculatively applied. These operations include a set of operations returned by the lookup to perform upon the packet, and these operations are cached in the prediction cache.

The predictor 112a sends the predicted flow for the packet to the forwarding engine 114a, or the predictor 112a sends the operations for the predicted flow to the forwarding engine 114a, and the forwarding engine 114a receives the data from the packet and the operations. It acts upon the operations to forward/modify the packet as instructed. Thus, the operations determined from the predicted flow are used to determine the egress port for the packet, and the forwarding engine 114a send the packet on the switch fabric 120 to the egress port. In one example, the per-port prediction cache 117a includes flow and egress port pairs. So, once the flow is identified, the egress port is also identified, and the egress port may be sent to the forwarding engine 114a, so the forwarding engine 114a can forward the packet via the switch fabric 120 to the egress port. As data for the packet is received, the data is forwarded to the egress port.

The lookup module 113a performs a lookup for the received packet while the flow prediction is performed. The lookup is also performed while the packet is being forwarded to the egress port if a prediction can be made for the flow membership of the packet. The lookup module 113a determines the flow key for the received packet, as the packet data is received or after the entire packet is received. A flow table, which may include a large database of flow keys, is searched by the lookup module 113a. The lookup module 113a and the flow table may be implemented in software using SRAM and a fast network processor, or more often implemented in hardware by ternary content addressable memories (TCAMs). TCAMs are an expensive, high performance resource for the switch. The TCAMs may be shared by multiple input ports on the same line card and consequentially may be subject to contention and further arbitration delays. The process of searching the flow table can be a time consuming and critical stage in the switch pipeline with complexity O(log N). Also, the duration of the lookup steps depends upon the complexity of the switching policy. Functions such as access control lists (ACLs), application rate meters or content aware filtering may require multiple passes through the flow table, as represented by the feedback shown in FIG. 1 for the lookup module 113a.

The lookup identifies the egress port for the packet based on its flow. If the egress port identified from the lookup differs from the egress port identified from the prediction process, packet transmission to the incorrect egress port is stopped by the forwarding engine 114a if the packet has not been completely transmitted to the incorrect egress port. Also, the packet is forwarded to the egress port determined from the lookup. In another embodiment, accuracy of the prediction process is confirmed using the flow key. For example, the lookup module 114a determines the flow key for the packet. Also, the predictor 112a determines the flow key based on the match of the signature to a stored signature in the per-port prediction cache 117a. Along with each stored signature, a flow key may also be stored. If the flow key from the per-port prediction cache 117a matches the flow key determined by the lookup module 113a, then the prediction is determined to be correct. If the prediction was incorrect, the packet is forwarded to the correct egress port. In this embodiment, there may be no need to invoke the lookup process because the prediction is confirmed with the flow key rather than the lookup.

In addition to determining the flow and the egress port for the flow, policies associated with the flow and modifications associated with the flow are also determined and administered. Based on a packet's flow membership, the forwarding engine 114a may apply a particular flow policy. Applications such as firewalling, intrusion detection/prevention, connection rate metering and load balancing all rely upon deep packet inspection and rapid flow classification of each packet. In addition, there is a trend towards multiplexing a variety of different traffic types (e.g., voice, video and data), each potentially with different service requirements, onto the same network fabric. In all of these situations, low latency, yet policy rich forwarding based upon flow classification would be useful.

After the forwarding engine 114a forwards the packet to the egress port on the switch fabric 120, the line card with the egress port receives the packet. For example, assuming the line card 110b includes the egress port, the forwarding engine 114b receives the packet. The forwarding engines may include interfaces for sending and receiving packets on the switch fabric 120. The forwarding engine 114b sends the packet to the port 111b, which is the egress port in this example. The output memory 116b stores the packet data for transmission on the port 111b to the network. Other organizations of memory and ports are possible.

Figure 2:
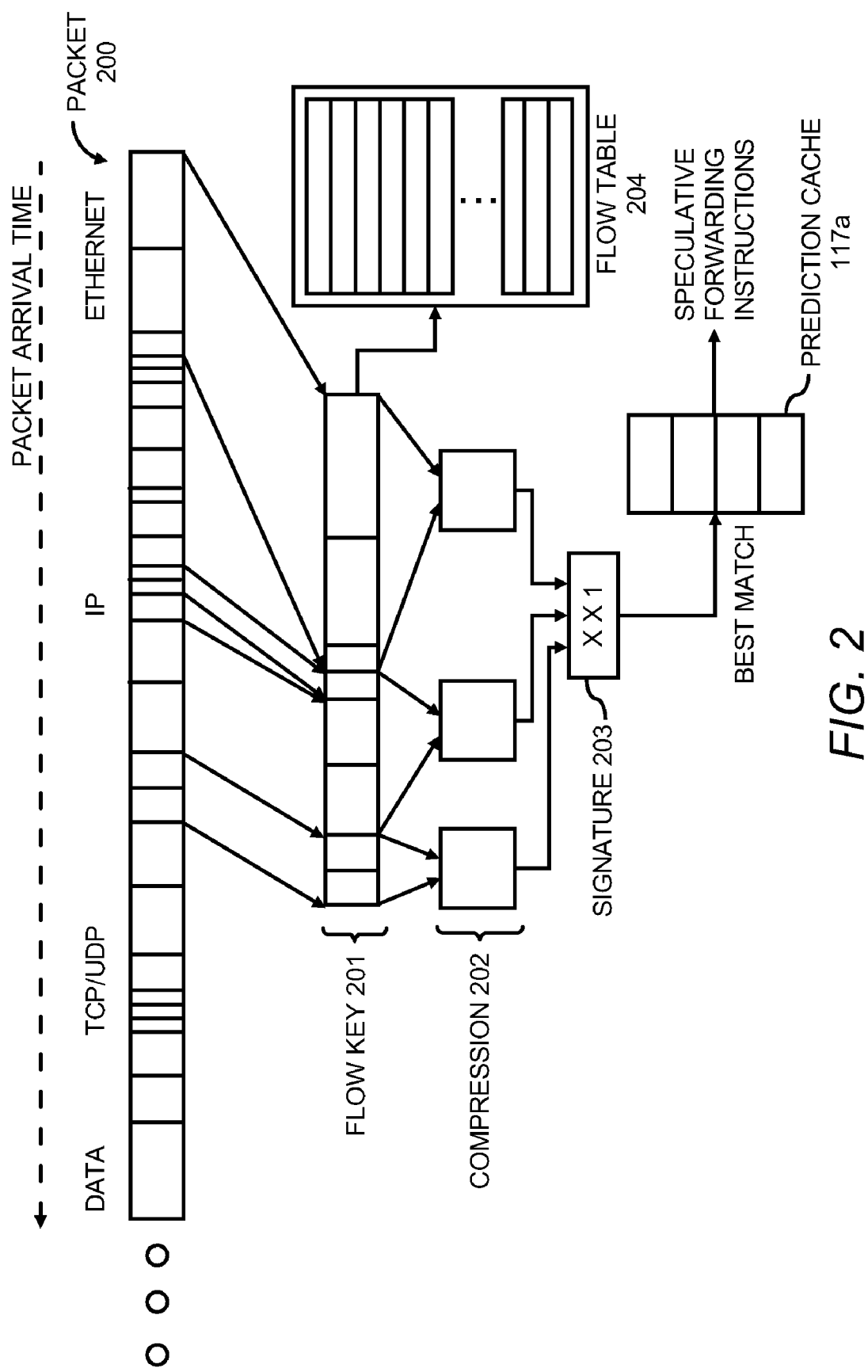
FIG. 2 illustrates flow prediction and a lookup, according to an embodiment.

FIG. 2 illustrates signature creation relative to packet reception and flow key lookup. A packet 200 is received. Packet data for the packet 200 is received, as represented by the packet arrival time. The flow key 201 is determined from the packet data. In one example, the flow key is created from header information in the packet. In other examples, the data in the payload may also be used to generate the flow key 201.

Compression 202 is performed using some of the bits of the flow key. As bits of the flow key are received, the signature 203 is computed. Compression 202 refers to methods for computing the signature 203. Examples of compression are described below with respect to methods for generating a signature.

The signature 202 is searched in the local per-port prediction cache 117a that contains the signatures of previously received packets. If a match is found, the packet is assumed to be part of the same flow as the matching signature and the same operations (e.g., packet forwarding to the egress port, applying flow policies, modifying the packet, etc.) are applied.

The prediction process and operations occur in parallel with the traditional lookup stage. The lookup stage is shown in FIG. 2 by the flow key 201 being used to search the flow table 204 to determine the flow of the packet.

Switch latency is the amount of delay a packet experiences inside the switch, and will be measured as the amount of time between when the first bit of a packet is received on the ingress port and the time the first bit is transmitted on the egress port. This formula represents the time taken to receive enough of the packet to construct enough of the packet signature to find a match in the prediction cache, plus the time to transfer the first bit of the packet across the fabric.

Switch latency for flow predicting switching is limited by the time it takes to generate enough of the packet signature to confirm a match in the prediction cache. Let $S=\{S_1, S_2, \ldots S_m\}$ be a packet signature of length m that consists of a set of bits that have been derived from the fields H in the packet. There are a set of functions F that derive bits $S_1$ through $S_j$ of S from the fields H as they arrive from the network. Let $K_p$ be the number of bits received to form enough of S to find a match in the prediction cache. Let $R_f$ be the fabric interface transfer rate in bps and assume Let $R_p$ be the received port line rate in bps and let L be the length of the packet in bits. Let $R_f$ be the fabric interface transfer rate in bps and assume that $R_f > R_p$. Then the latency for a packet predicting speculative switch is as follows: Packet Prediction with Speculation Latency 32 $(K_p/R_p)+1/R_f$. Note that we assume that bits can be transmitted on the egress port as soon as they are transferred across the switch fabric. In otherwords, we are not considering any contention on the egress buffer or port, nor do we assume any delays to begin transmitting the packet, such as interpacet-gap, preamble, etc. Thus, the true latency would need to consider those additional overheads.

Figure 3:
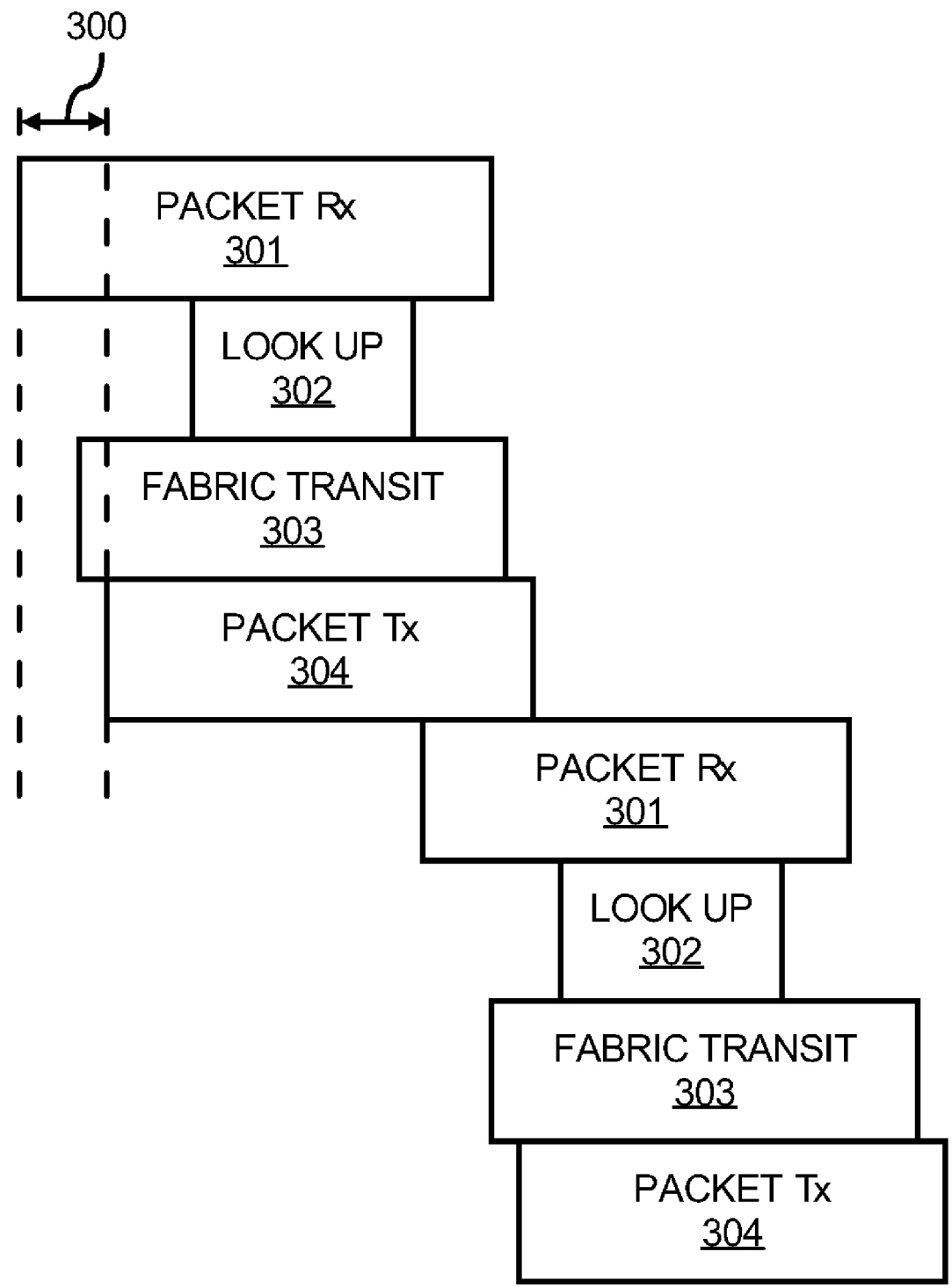
FIG. 3 illustrates a switch latency, according to an embodiment.

Switch latency 300 is illustrated in the pipeline diagram shown in FIG. 3. The switch latency is only shown for one packet, but, of course, there is latency for each packet. The latency would be similar for each packet, depending on the length of the packet, applicable flow policies, etc. The packet Rx 301 represents bits of a packet being received, for example, on the port 111a shown in FIG. 1. Lookup 302 represents the lookup procedure performed by the lookup module 113a. The lookup 302 does not begin until enough of the bits have been received to construct a flow key. The fabric transmit 303 represents transmission of the packet data on the switch fabric 120 to the egress port, and packet Tx 304 represents transmission of packet data from the egress port.

Note that at least one bit of the packet may be transmitted on the switch fabric 120 prior to the lookup being performed based on the predicted flow. Also, at least one bit of the packet may be transmitted from the egress port prior to the lookup being performed. This is indicative of a significant reduction of switch latency when compared to a non-predictive switching that would rely solely on the lookup to determine the packet flow.

Also, the flow prediction process starts as bits of the packet are received, as represented by packet Rx 301, and continues until a match in the prediction cache is found or no match is found. If a match is found, the packet prediction process ended prior to the fabric transit 303 and prior to the packet Tx 303. In other words, the flow is predicted, and packet data is transmitted on the switch fabric 120 and transmitted from the egress port, for example, prior to starting the lookup 302.

As described above with respect to FIG. 2, compression 202 is performed to determine the signature 203 for the packet 200. Examples of different types of compression will now be described but others may be used.

There are numerous ways to construct the packet signature. One method for generating and matching packet signatures is Fixed. The Fixed method extracts bits from pre-defined locations in the packet as it is arriving. The offset locations may be chosen based on experience, intuition, port configuration and an understanding of the important packet fields in an untagged Ethernet frame carrying a UDP or TCP message. Since the bit offsets are predetermined and fixed, there is no logic that parses the packet and adjusts the offset according to the frame encapsulation. As a consequence, bit offsets that would normally align with the TCP port fields will be unaligned if the packet is VLAN tagged, and may point to user data if the packet is an IP fragment. For another implementation of this method, a different set of offsets may be used based upon the port configuration.

A signature is constructed and various sizes are possible. Below are examples of how to construct these specific sizes. The bits that are chosen to be extracted for the Fixed method are bits that are expected to vary the most between distinct flows. This includes the group address bit in the destination MAC address, low order address bits in both the MAC and IP headers, bits from the IP protocol field, and the TCP/UDP port numbers.

The set of bit offsets selected for the signatures (where the first bit of the packet is noted as offset 0) are listed in Table 1.

TABLE 1

Fixed Bit Offsets for Packet Signatures

| Signature | Bit Offset |
|---|---|
| 8-bit | 7, 47, 94, 95, 238, 239, 270, 271 |
| 16-bit | 7, 46, 47, 94, 95, 100, 187, 190, 238, 239, 270, 271, 286, 287, 302, 303 |
| 24-bit | 7, 46, 47, 92, 93, 94, 95, 96, 100, 109, 110, 187, 189, 190, 237, 238, 239, 269, 270, 271, 286, 287, 302, 303 |
| 32-bit | 7, 45, 46, 47, 92, 93, 94, 95, 96, 100, 109, 110, 187, 189, 190, 191, 236, 237, 238, 239, 268, 269, 270, 271, 284, 285, 286, 287, 300, 301, 302, 303 |

The Fixed method must wait for the last bit offset to arrive before constructing the packet signature. Once the signature is assembled, it is compared to the signatures in the prediction cache, such as the prediction cache 117a shown in FIG. 1.

Another method of signature generation is the Eager method. The Eager method uses the same bit offsets as the Fixed method to construct the signature, but builds partial signatures as the bits arrive. The partial signatures are presented as a key where missing bits are marked as don't care conditions for the match. If no matching entries are found, there are clearly no previous elements from this flow in the cache and the packet must wait for the flow lookup to complete and be forwarded normally. If there is precisely one entry found, then there is a chance that this entry is an exact match and the speculative forwarding of the packet may start immediately. This method forwards the packet as soon as possible, but experiences a higher misprediction rate. If a false positive occurs, the prediction cache is queried again with the full signature in order to replace the incorrect entry. Receiving more bits for the signature can reduce the chance of a false positive match, but the probability of a misprediction cannot be completely eliminated. Note that when the flow key is also stored as data in the cache, it can be compared exactly to determine if the packet was miss predicted or not, so in this case the probability of a misprediction can be eliminated.

Yet another method for signature generation is the Hash method. The Hash method waits for the first 304 bits of the packet to be received and then constructs a 29-byte flow buffer from the offsets into the 9 fields of the packet that constitutes a flow. Note that a predetermined number of bits other than the first 304 bits may be used to construct a flow buffer. Also, the size of the flow buffer and the number of fields may be different than described above.

The Hash method does not interpret the bits of the packet, but rather extracts the predetermined offsets for these fields from what is presumed to be an untagged Ethernet frame encapsulating a TCP or UDP message. As with the Fixed method, if the packet is not a TCP/IP packet, if it is VLAN tagged or if it is an IP fragment, the offsets will not align with the desired fields. The flow buffer is constructed with whatever bits are located at the predetermined offsets.

A conventional hash function is then applied to the 29-byte flow buffer to create the signature of the desired size. The prediction cache is then searched using this signature. Similar to the Fixed method, the packet may not be forwarded until at least the first 304 bits have been received.

Yet another method for signature generation is the Smart Hash method. The Smart Hash method is similar to the Hash method, except that logic is applied to parse the packet to properly create the 29-byte flow buffer. The logic is capable of decoding the exact Ethernet header used and whether the frame is a TCP/UDP message, IP fragment or some other type of layer 2 protocol. Fields of the 29-byte flow buffer that are not present in the packet are filled with zeros. If the packet is an IP fragment, then the IP fragment ID field is used instead of the TCP/UDP port numbers.

The goal of the Smart Hash method is to trade off more logic in the packet prediction implementation for a more accurate packet signature to reduce the number of false positive matches. Similar to the Fixed and Hash methods, the packet may not be forwarded until the first 304 bits have been received.

Yet another method for signature generation is the Eager Hash method. The Eager Hash method is also similar to the Hash method, with the difference being that the signature is assembled from separate hashes of distinct portions of the 29-byte flow buffer. This method waits for the offsets of distinct chunks of the packet to arrive, such as the Ethernet header, IP addresses or TCP port numbers, and calculates a hash based only on those chunks to perform partial construction of the signature for eager matching in the cache. Once a partial signature has been created from the hashes, it is presented to the fully associative prediction cache with missing portions of the signature marked as don't cares. As with the Eager method, if there is no matches or exactly one match, the search is terminated. The goal of this method is to forward the packet as soon as possible, but also reduce the number of false positives that might exist in the Eager method.

Yet another method for signature generation is the Smart Eager Hash method. The Smart Eager Hash method combines the informed construction of the flow buffer used in the Smart Hash method with the early speculative forwarding of the Eager Hash method.

Figure 4:
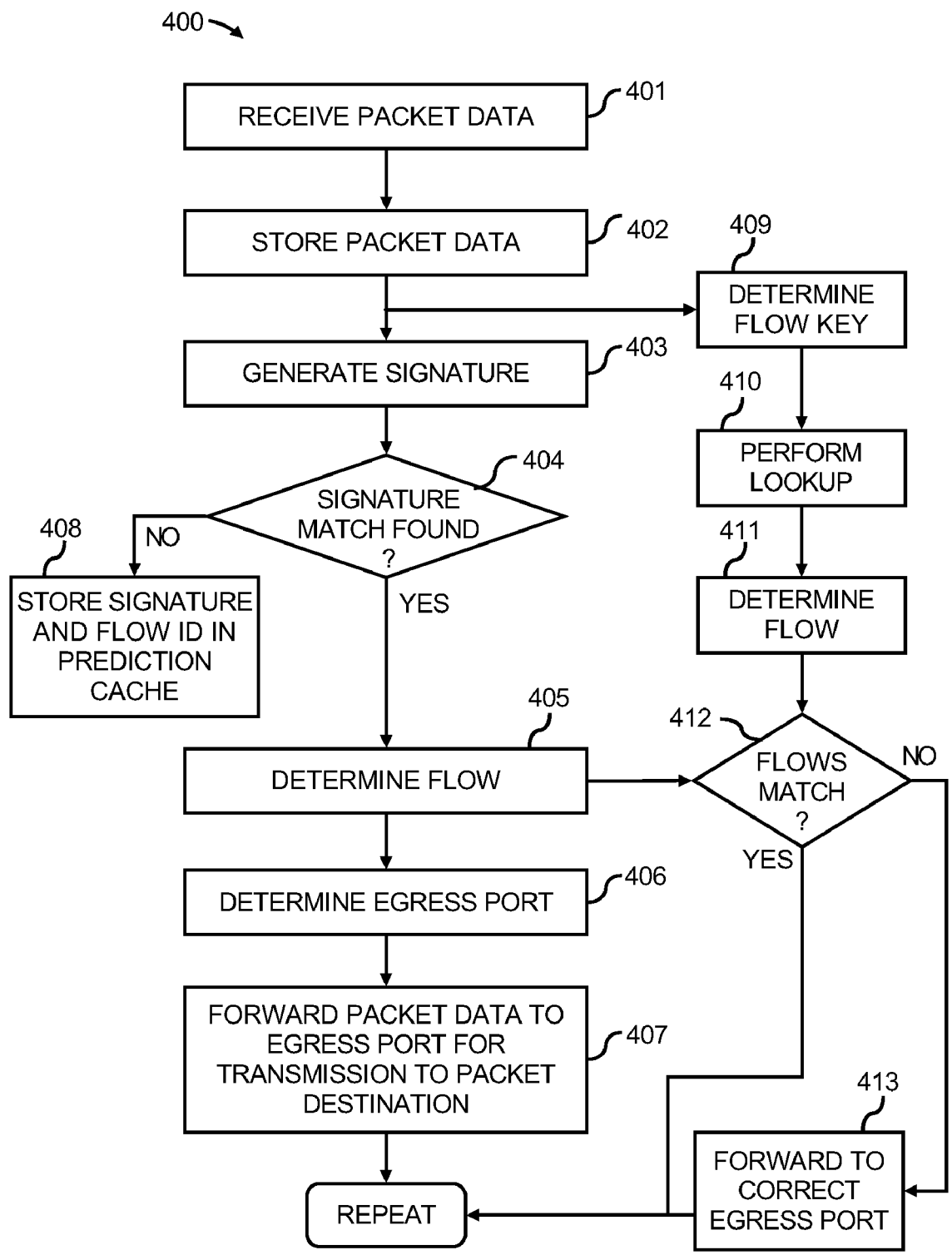
FIG. 4 illustrates a method for speculative packet forwarding, according to an embodiment.

FIG. 4 illustrates a flow chart of a method 400 for predictive switching in a network switch, according to an embodiment. At step 401, packet data for a packet is received. At step 402, the packet data is stored in input memory. Steps 402 and 403 are performed on a bit-by-bit basis. That is as bits of a packet are received steps 403 and 409 and subsequent steps are continually performed as the bits are received. This may include snooping packet data as it is written into memory. At step 403, the packet data is used to generate a signature as the packet is received. Examples of signature generation methods may include Fixed, Eager, Hash, Smart Hash, Eager Hash and Smart Eager Hash. Portions of a flow key may be used to determine the signature. At step 404, the signature is used to search a prediction cache of signatures to determine whether there are any matches. If a match is found, the flow for the matching signature is identified at step 405. For example, a corresponding flow ID is stored with signature. At step 406, an egress port associated with the flow is determined, and the packet data is forwarded to the egress port for transmission to the packet's destination at step 407.

If a match is not found at step 404, then the signature determined at step 403 is stored in the prediction cache, along with a corresponding flow ID at step 408. The corresponding flow ID may be determined from the lookup, which is performed in parallel with the prediction process, as described below.

At step 409, a flow key is determined for the packet. At step 410, a lookup is performed using the flow key. At step 411, a flow is determined from the lookup. Steps 409-411 are performed simultaneously with steps 401-408.

At step 412, the flow determined from the lookup is compared with the flow determined from the prediction process (e.g., steps 401-405). If the flows match, then the method 400 is repeated for the next received packet. If the flows do not match, then the flow determined from the lookup is used to identify the egress port, and the packet data is forwarded to the correct egress port at step 413. In another embodiment, a flow key determined from the prediction process is compared to a flow key determined from the lookup to confirm the accuracy of the flow prediction.

One or more of the steps of the methods described herein and other steps described herein may be implemented as software embedded on a computer readable medium, such as the memory or other form of data storage and executed by a processing circuitry.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims and their equivalents in which all terms are meant in their broadest reasonable sense unless otherwise indicated.

What is claimed is:

1. A network switch comprising:
   a predictor to use data in a packet to predict a flow for the packet;
   a memory to store bits of the packet as the packet is received by the network switch;
   a forwarding engine to forward at least a portion of the packet on a switch fabric to an egress port determined from the predicted flow; and
   a lookup module to perform a lookup to determine a flow for the packet,
   wherein the forwarding engine is to forward the at least a portion of the packet on the switch fabric to the egress port determined from the predicted flow prior to the lookup module determining the flow, and the predictor is to determine the bits prior to the storing in the memory or at the same time of the storing in the memory.

2. The network switch of claim 1, wherein the forwarding engine is to forward the at least a portion of the packet on the switch fabric to the egress port determined from the predicted flow prior to the lookup module performing the lookup.

3. The network switch of claim 1, wherein the at least a portion of the packet is transmitted from the egress port prior to the lookup module performing the lookup.

4. The network switch of claim 1, further comprising using a flow key determined by the lookup module to confirm the predicted flow is a correct flow for the packet.

5. The network switch of claim 1, comparing a flow key determined by the predictor to a flow key determined from the data in the packet to confirm the predicted flow is a correct flow for the packet.

6. The network switch of claim 1, wherein the predictor is to determine a signature from only some of the bits of a flow key of the packet and compares the determined signature to stored signatures to predict the flow.

7. The network switch of claim 6, wherein the signature is generated from one of Fixed, Eager, Hash, Smart Hash, Eager Hash, and Smarty Eager Hash method.

8. The network switch of claim 6, wherein the lookup module is to perform the lookup using the flow key in its entirety.

9. A flow prediction method for packet forwarding in a network switch comprising:
 predicting a flow for a packet received at a network switch from some bits of a flow key;
 storing bits of the packet as the packet is received;
 determining the bits of the packet prior to the storing or at the same time of the storing;
 forwarding at least a portion of the packet on a switch fabric to an egress port determined from the predicted flow; and
 performing a lookup to determine a flow for the packet, wherein the forwarding the at least a portion of the packet on the switch fabric to the egress port determined from the predicted flow is performed prior to a lookup module completing the lookup.

10. The method of claim 9, wherein the forwarding further comprises:
 forwarding the at least a portion of the packet on the switch fabric to the egress port determined from the predicted flow prior to the lookup module performing the lookup.

11. The method of claim 9, further comprising:
 transmitting the at least a portion of the packet from the egress port prior to the lookup module performing the lookup.

12. The method of claim 9, further comprising:
 using the lookup to confirm the predicted flow is a correct flow for the packet.

13. The method of claim 9, wherein the predicting the flow further comprises:
 determining a signature from only some of the bits of the flow key for the packet; and
 comparing the determined signature to stored signatures to predict the flow.

14. A line card for a network switch, the line card comprising:
 at least one port to receive a packet;
 a predictor to use data in the received packet to predict a flow for the packet;
 a memory to store bits of the packet as the packet is received by the port; and
 a forwarding engine to forward at least a portion of the packet on a switch fabric to an egress port determined from the predicted flow;
 wherein the forwarding engine is to forward the at least a portion of the packet on the switch fabric to the egress port determined from the predicted flow prior to performing a lookup to determine a flow for the packet and the forwarding engine is to modify the at least a portion of the packet based on the flow, and the predictor is to determine the bits prior to the storing in the memory or at the same time of the storing in the memory.

* * * * *